April 14, 1959   J. L. AASLAND   2,881,579
CORN PICKER SNAPPING ROLL ADJUSTMENT MECHANISM
Filed April 4, 1957   2 Sheets-Sheet 1
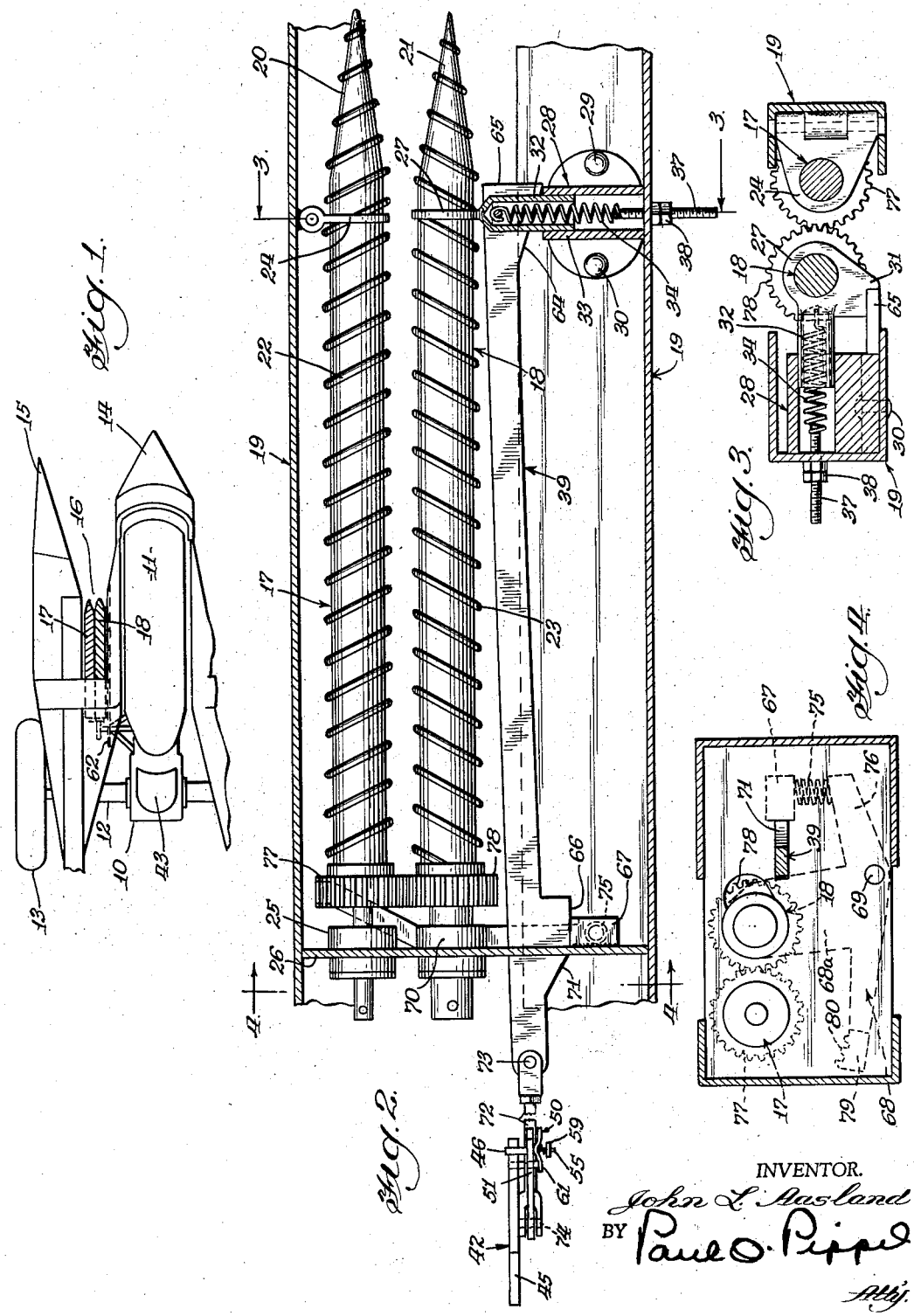
INVENTOR.
John L. Aasland
BY Paul O. Pippel
Atty.

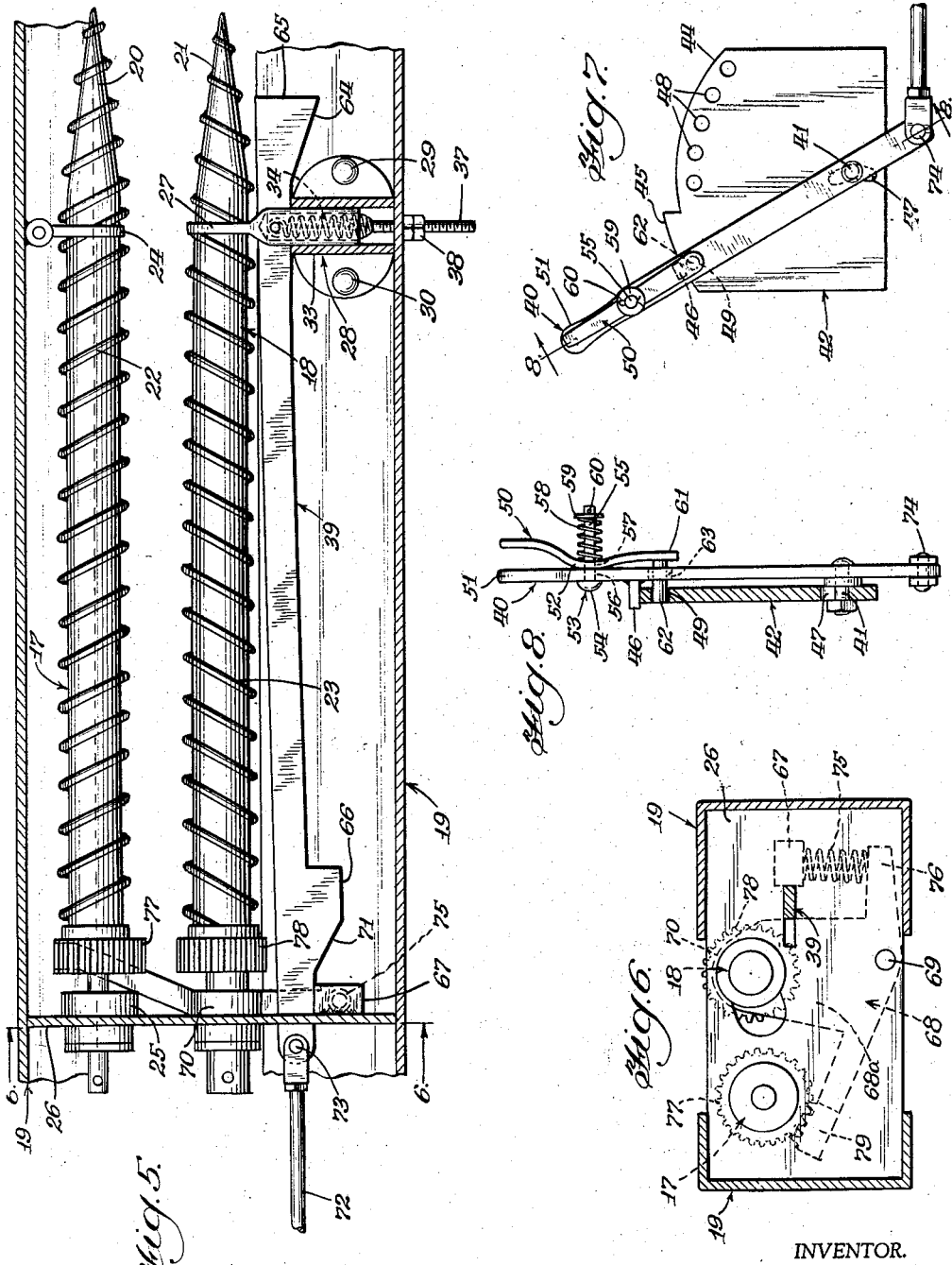

1

2,881,579

CORN PICKER SNAPPING ROLL ADJUSTMENT MECHANISM

John L. Aasland, Moline, Ill., assignor to International Harvester Company, Chicago, Ill., a corporation of New Jersey Application April 4, 1957, Serial No. 650,674

10 Claims. (Cl. 56—104)

This invention relates to a new and improved corn picker snapping roll adjustment mechanism.

The adjustable spacing of snapping rolls has become an integral part of corn pickers. The quick and easy adjustment of the spacing of corn picker snapping rolls permits continuous harvesting of corn regardless of conditions and also permits easy cleanout of a plugged corn picker. A remote control adjustment of corn picker snapping rolls is shown in the Hyman Patent 2,618,113. The present invention is an improvement and a modification over the Hyman patent.

A principal object of this invention is to provide a mechanism for adjustably spacing corn snapping rolls.

An important object of this invention is the provision of remote control means for adjusting the spacing of corn snapping rolls in a corn harvesting machine.

Another important object of this invention is to equip an adjustable mechanism for corn snapping rolls with means for facilitating the initial spacing of the forward or gathering ends of the snapping rolls throughout a full range of adjustment without affecting the spacing of the rearward ends of the rolls.

Another and further important object of this invention is to supply a device for adjusting the spacing of the forward portions of corn snapping rolls after which adjustment by the same mechanism causes a substantial separation of the rolls throughout their full lnegths to enable cleaning of the rolls.

Still another important object of this invention relates to a means for simultaneously locking the rolls against rotation when they are spaced the maximum distance apart throughout their length for cleanout purposes.

Other and further important objects and advantages will become apparent from the disclosures in the following specification and accompanying drawings.

In the drawings:

Figure 1 is a fragmentary top plan view of a tractor mounted corn picker incorporating the principles of this invention;

Figure 2 is an enlarged top plan view partially in section of that portion of the device of Figure 1 including the snapping rolls and their operating mechanism;

Figure 3 is a sectional view taken on the line 3—3 of Fig. 2;

Figure 4 is a sectional view taken on the line 4—4 of Figure 2;

Figure 5 is another top plan view partially in section of the snapping rolls similar to that shown in Figure 2, but with the rolls spaced fully apart;

Figure 6 is a sectional view taken on the line 6—6 of Figure 5;

Figure 7 is a side elevational view of the remotely positioned operating lever for adjusting the snapping roll spacing; and Figure 8 is a sectional view taken on the line 8—8 of Figure 7 but with the operating lever remaining in elevation.

As shown in the drawings, the reference numeral 10 indicates generally a tractor having a longitudinally extending body 11, a transversely extending rear axle structure 12 and widely spaced rear traction wheels 13 only one of which has been shown. A corn picker having spaced gathering points 14 and 15 is mounted on the tractor between the long narrow body 11 and one of the traction wheels 13. The gathering points 14 and 15 are adapted to guide standing corn in a field into an intermediate throat portion 16, the rearward end of which contains cooperative snapping rolls 17 and 18 adapted to grasp the stalk, pulling the stalk down therebetween to the point of attachement of the ear of corn, and thereupon to snap the ear from the stalk. The corn picker includes a supporting structure or frame work 19 adapted to carry the snapping rolls for rotation. The snapping rolls are cylindrical throughout the major portion of their length and have tapered forward points 20 and 21, respectively. Spiral ribs 22 and 23 are wound along the length of each of the rolls 17 and 18 and cooperatively act to move the stalks rearwardly between the rolls and also to more aggressively snap the ears of corn from the stalks.

The forward end of the roll 17 is journalled in a member 24 which is affixed to the frame or support 19. The upper reaward end of the snapping roll 17 is carried in a journal bearing member 25 which, in turn, is mounted on a supporting member 26 constituting a bridge between the spaced apart portions of the frame supporting structure 19. Thus, the roll 17 remains relatively fixed with respect to the supporting structure 19 except for rotation within the spaced journals 24 and 25. It is the roll 18 which moves relative to the roll 17 to accomplish the adjustable spacing of the rolls as provided in this invention.

The roll 18 is journally mounted in a bracket 27 which is capable of moving toward or away from a carrying socket or bracket 28 mounted on and forming an integral part of the supporting structure 19 by means of rivets or bolts or the like 29 and 30. The bracket 27 is provided with a laterally extending shoulder 31 and an outwardly extending sleeve like member 32 projecting toward the stationary bracket 28 of the supporting structure 19. The sleeve 32 is slidably journalled within a sleeve portion 33 of the stationary bracket 28 thus providing for movement of the roll journalling portion of the bracket 27 toward and/or away from the roll 17. A spring 34 is mounted within the sleeve 32 of the bracket 27 and is anchored at 35 therein. The other end of the spring 34 is attached at 36 to a threaded bolt member 37 which is locked to the supporting structure 19 by means of lock nuts 38. Thus, the spring 34 normally urges the roll 18 outwardly away from the roll 17.

A slide operating member 39 is adapted to be moved longitudinally adjacent the roll 18 by means of an operating lever 40 which is pivotally mounted at 41 on a plate-like quadrant member 42 located on the supporting structure 19 closely adjacent an operator's station or seat 43 on the tractor 10. The quadrant 42 consists of a first or lower level arcuate track 44 and an upper or second level radially offset arcuate track 45 of considerably shorter extent. A projection 46 on the side of the hand lever 40 is adapted to ride the arcuate surface 44 when the lever hinge pin 41 is in the upper end of an elongated slot 47 within the lever 40. Conversely, when the hand lever 40 is raised so that the hinge pin 41 is in the bottom of the elongated slot 47, the projection 46 is adapted to ride on the arcuate surface 45. A series of arcuately disposed spaced apart openings 48 are provided in the supporting plate 42 immediately beneath the lower arcuate surface 44. Similarly, a hole 49 is disposed adjacent to and slightly beneath the upper arcuate surface 45. Detent means is associated with the hand lever 40 for engaging any one of the holes 48 or 49 to effect a holding of the operating arm 39 in any desired fixed position. The detent means is shown more specifically in Figure 8. A hand engaging member 50 is spaced slightly away from the upper end or hand engaging portion 51 of the hand lever 40. The member 50 extends downwardly and is curved inwardly to a point where it is flush with and is hinged to the hand lever 40 as shown at 52. A pin 53 having a head 54 and a shank member 55 acts as the means for hinging the member 50 with respect to the hand lever 40. The head 54 of the pin 53 rests against one side of the hand lever 40 while the shank 55 passes through an aperture 56 in the hand lever 40 and through an aperture 57 in the member 50. A spring 58 is mounted on the shank 55 outwardly of the member 50 and within a washer 59 mounted adjacent the outer end of the shank 55. A cotter pin or the like 60 passes through the shank 55 and holds the washer in fixed position on the shank 55. The spring 58 thus urges the member 50 into abutting relationship with the hand lever 40. A downwardly projecting extension 61 of the member 50 located beneath the shank 55 of the pin 53 has a detent or projection member 62 extending laterally therefrom and arranged and constructed to pass through an opening 63 in the hand lever 40 and engage any one of the notches 48 or 49 as shown in Figure 7. In the device as shown in Figure 8, the detent pin 62 is shown passing through the hole 49 thus holding the hand lever 40 against rocking movement until such time as the operator squeezes the member 50 to the hand lever 40 at the top thereof thus causing an outward swinging of the detent or pin 62 from the hole 49. The lever 40 may then be arcuately swung about its hinge pin 41 and dropped the length of the elongated slot 47 whereafter the projection 46 rides on the lower arcuate surface 44. The member 50 may be released to engage any one of the spaced apart holes 48. It is thus apparent that the operating bar 39 is controlled by the position of the hand lever 40 and this control insures the desired spacing of the snapping roll 18 with respect to the stationary roll 17.

As best shown in Figures 2 and 5, the operating bar 39 is provided with various surface conformations on its lateral outside to provide for the initial adjustment of the forward ends of the snapping rolls and subsequently the upper rearward ends of the snapping rolls. The outer end of the operating bar 39 is equipped with an inclined surface 64 that extends from a relatively thick or wide portion of the rod 39 at the extreme outer end thereof to a relatively narrow portion toward the center of the bar 39. As shown in Figure 3, the operating rod 39 rides under the shoulder or ledge 31 which as previously stated, forms part of the bracket 27 journally holding the snapping roll 18. When the operating bar 39 is in its extreme rearward position as shown in Figure 2 and as evidenced by the position of the hand lever 40 in Figures 7 and 8, the wide portion at the extreme end thereof designated by the numeral 65 has caused the ledge 31 of the roll journal 27 to be moved inwardly thereupon causing the roll 18 to be moved to its closest position adjacent the roll 17 against the action of the biasing spring 34 which as previously stated normally tends to separate the snapping rolls. Now in the event the operating rod 39 is moved forwardly, the spacing between the bracket 27 and the bracket 28 is lessened by reason of the inclined surface 64 thereupon permitting the spring 34 to pull the forward portion of the snapping roll 18 away from the snapping roll 17 to the degree or extent of the width of the operating rod at any particular position along the inclined surface 64.

A rear portion of the operating bar 39 has a straight sided projection 66 which is substantially elongated in its extent. The portion 66 is parallel to the inside of the operating bar 39 so that longitudinal movement of the operating bar will not effect a change in the positioning of the rear portion of the snapping roll 18 throughout the extent of this portion 66. As shown in Figure 4 the operating bar 39 and particularly its widened extensive straight portion 66 is positioned on a stationary block member 67 which is mounted fixedly with respect to the supporting structure 19. A rockable bell-crank bracket member 68 is pivoted at 69 on the supporting structure 19. The bracket member 68 has a first arm 68a which is adapted to journally support the snapping roll 18 at its upper rearward end through the medium of a journal bearing member 70. The top of the operating bar 39 is positioned directly beneath the journal 70 on a ledge of the first arm 68a. Thus as the operating bar 39 is moved along the range of holes 48 the portion 66 which as previously stated is uniformly wide throughout its extent will prevent change in the spacing of the rolls 18 and 17 at their upper or rearward ends. Further throughout the extent of the portion 66 the rolls 17 and 18 are closely spaced together for best operating conditions. It has been found desirable during operation of corn pickers in the field to change the spacing of the snapping rolls only at the forward end thereof to accommodate various weather conditions or conditions of the stalks to be picked. It seems necessary only to variably space the forward ends of the rolls and at the same time maintain the rearward ends of the rolls in a relatively fixed spaced-apart position. With the operating bar 39 constructed in this manner the longitudinal movement thereof effects a variable spacing of the forward end of the rolls without affecting the spacing of the rearward ends of the rolls until such time as maximum movement of the hand lever 40 is occasioned by a lifting of the hand lever over onto the upper arcuate surface 45 as shown in Figure 7 whereupon the narrowest parts of the operating bar 39 are positioned between the brackets 27 and 28 and 67 and 68 respectively. As shown in Figure 4 the rearward end of the operating bar 39 adjacent the portion 66 is relatively sharply inclined inwardly as at 71 to provide for the spacing of the rolls 18 and 17 such as shown in the position of the rolls in Figure 5 wherein they are spaced throughout their entire lengths. A link member 72 is hingedly mounted at 73 on the operating rod 39 at one end and is pivotally mounted at 74 on a lower extension of the hand lever 40 at its other end. Thus movement of the hand lever 40 about its hinge pin 41 will effect a direct longitudinal movement of the operating bar 39 in either direction depending upon the direction of swinging movement of the lever 40.

A spring 75 is shown abutting the stop member 67 beneath the slidable bar 39 and engages at its other end a downwardly depending arm 76 of the rocking bracket 68. Thus the spring 75 normally tends to swing the snapping roll 18 away from the snapping roll 17 in much the same manner as the spring 34 at the forward end of the rolls.

The rolls 17 and 18 are provided with spur gears 77 and 78 which as shown in Figure 2, are in meshing engagement with each other so that as one of the rolls is rotatably driven rotation is thus imparted to the adjacent roll. When it is desired to clean out a clogged corn picker the rolls 17 and 18 are fully spaced apart throughout their entire length such as shown in the position of the rolls in Figure 5 wherein the hand lever 40 has been pulled fully rearwardly and the detent thereof 62 locks in the hole 49 in the quadrant 42. This means that both narrow portions of the operating bar 39 are within their respective positions to permit the springs 34 and 75 to pull the forward and rearward ends of the roll 18 the maximum distance away from the roll 17. At this time an operator may manually pull out clogged stalks from the widely spaced rolls. When the rolls are just short of maximum separation and the machine is still running it is quite evident the rolls will normally cause a self-cleaning whereby operation of the machine may continue uninterruptedly. However, in the event an operator is to manually clean out the snapping rolls it is believed necessary to stop rotation of the rolls during such clean-out period for safety reasons. To insure the stationary condition of the rolls with regard to rotation thereof an interlocking member 79 constitutes an upper extension of the bracket 68 and has a toothed member 80 adapted to engage the spur gear 77 of the driving roll 17 when the roll 18 is pulled away therefrom its maximum distance. This engagement of the offset arm 79 with its tooth surface 80 is shown in Figure 6. The operation of this safety device is automatic and whenever the rolls are fully spaced apart the saw tooth edge 80 engages the spur gear 77 to halt and insure continued stationary condition of the rolls 17 and 18. It should be understood that the engagement of the tooth surface 80 with the spur gear 77 only comes into effect when the rolls are at their maximum spacing and for purposes of self cleaning while the rolls are still running the hand lever and the operating bar 39 must be halted during the incline 71 of the operating bar to prevent the stopping of drive to the rolls.

In the operation of the device of this invention snapping roll adjustment throughout the usual operating range is accomplished by a shifting of the hand lever 40 across the lower arcuate surface 44 for stopping in any one of the plurality of spaced-apart holes 48. The detent 62 may be locked in any one of the holes 48 as desired to effect that particular roll spacing. As previously explained the movement throughout the entire range 44 of the hand lever causes movement or spacing of only the forward ends of the snapping rolls 17 and 18. This is true because the operating arm or bar 39 has the inclined actuating surface 64 commencing immediately upon movement throughout that range whereas the straight surface 66 on the rearward end of the bar 39 is parallel to the inner edge and therefore there is no change in the spacing of the rearward end of the rolls until maximum movement is effected by the hand lever 40 over into the second or upper range 45. When the hand lever 40 is raised to the range 45 on the quadrant 42 the operating bar 39 is in such a position that the supporting journal members for the roll 18 may move laterally outwardly away from the roll 17 so the spacing from the front to the rear of the rolls is substantial and relatively uniform throughout the length. Simultaneously it will be remembered the drive for the rolls is locked out by the engagement of the spur gear 77 with the gripping surface 80 of the bellcrank member on which the roll 18 is mounted for swinging movement away from the roll 17. This insures that servicing of the corn picker may be safely accomplished without fear of injury to the service personnel.

I am aware that numerous details of construction may be varied throughout a wide range without departing from the principles disclosed herein, and I therefore do not propose limiting the patent granted hereon, otherwise than as necessitated by the appended claims.

What is claimed is:

1. A device for regulating the spacing between corn snapping rolls in a corn picker comprising a supporting structure, a pair of cooperative rolls having forward and rearward ends, said rolls mounted in a generally longitudinal position in said supporting structure, one of said rolls having spaced apart carrying members mounted on said supporting structure adjacent the forward and rearward end of said rolls, a longitudinally extending operator member lying parallel to said cooperative rolls and arranged on said supporting structure for longitudinal sliding movement, spaced apart projections on said operator member located adjacent the carrying members, said projection on the forward end of the operator member adjacent the carrying member at the forward end of the roll constituting a continuously inclined surface, and said projection adjacent the carrying member at the rear end of the roll constituting a straight surface parallel with the inner edge of the operator member for a substantial extent, spring means urging said continuously inclined projection at the forward end and said straight surface projection at the rearward end simultaneously into contact with the respective carrying member adjacent thereto, whereby limited longitudinal movement of the operator member will effect adjustable spacing of the forward ends only of the snapping rolls.

2. A device as set forth in claim 1 in which the projection adjacent the carrying member at the rear end of the roll further includes a sharply inclined surface forming a continuation of the straight surface whereby continued longitudinal movement of the operator member causes separation of the roll throughout its length.

3. A device as set forth in claim 2 in which the carrying member at the forward end of the roll includes a journal for the roll, a sleeve integral with the journal and extending laterally therefrom, a spring anchored within the sleeve at one end and to the supporting structure at the other end, and a shoulder integral with said journal and offset to one side thereof to slidably receive the operator member, means on said supporting structure for guiding said sleeve and further means on said supporting structure in alignment with said shoulder, whereby longitudinal movement of the operator member disposes greater or less operator member width between the shoulder and the means in alignment therewith to effect greater or less roll spacing at the forward end of the rolls.

4. A device as set forth in claim 2 in which the carrying member at the rear end of the roll includes a bell-crank member hingedly mounted on said supporting structure, a first arm on said bell crank member having a roll journal, a second arm on said bell crank member having a spring abutting thereagainst and reacting against said supporting structure to urge rotation of said bell crank member, and ledge means on the first arm of the bell crank member and arranged to slidably receive the operator member which reacts against said supporting structure whereby longitudinal movement of the operator member causes swinging of the bell crank member about its hinge after the sharply inclined surface continuation of the straight surface enters the space between the ledge means and the supporting structure.

5. A device as set forth in claim 4 in which the snapping rolls are equipped with spur gear members, one of said snapping rolls being rotatably driven and adapted when the spur gear members are meshed with each other to impart rotation to the other of said snapping rolls, said bell crank member having a third arm and means thereon for engaging and brakingly meshing with said spur gear member on the rotatably driven roll when the operator member has moved its maximum extent.

6. A device as set forth in claim 2 in which there is included means associated with said operator member for effecting longitudinal movement of said operator member.

7. A device as set forth in claim 6 in which said means for effecting longitudinal movement includes a quadrant affixed to said supporting structure, and a hand lever hingedly mounted on said quadrant and engaging an end extension of said operator member.

8. A device as set forth in claim 7 in which the quadrant has two surface ranges including a first arcuate surface and a second radially offset arcuate surface, and projection means on said hand lever for slidably engaging the arcuate surfaces, said hand lever having an elongated slot for the hinging to the quadrant whereby the hand lever may be shifted to have the projection means engage either of said first or second arcuate ranges.

9. A device as set forth in claim 8 in which the extent of the first of said arcuate ranges is substantially the same as the extent of the straight surface projection on said operator member.

10. A device as set forth in claim 9 in which detent means is associated with said hand lever for engagement with said quadrant.

References Cited in the file of this patent

UNITED STATES PATENTS

| | | |
|---|---|---|
| 702,720 | Gernand | June 17, 1902 |
| 2,618,113 | Hyman | Nov. 18, 1952 |